United States Patent [19]

Fortier et al.

[11] Patent Number: 6,156,286
[45] Date of Patent: *Dec. 5, 2000

[54] SEEDING OF ARAGONITE CALCIUM CARBONATE AND THE PRODUCT THEREOF

[75] Inventors: Steven M. Fortier, Milledgeville; Bruce Jackson, Sandersville, both of Ga.

[73] Assignee: Imerys Pigments, Inc., Roswell, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,871

[22] Filed: May 21, 1997

[51] Int. Cl.$^7$ ................................................. C01B 31/24
[52] U.S. Cl. .............................................................. 423/432
[58] Field of Search ...................... 423/430, 432

[56] References Cited

U.S. PATENT DOCUMENTS

| | | | |
|---|---|---|---|
| 2,538,802 | 1/1951 | Schur et al. | 423/432 |
| 3,197,322 | 7/1965 | Maskal et al. | 106/306 |
| 3,627,480 | 12/1971 | Birchall | 23/66 |
| 3,669,620 | 6/1972 | Bennett et al. | 23/66 |
| 3,869,299 | 3/1975 | Periard | 106/306 |
| 4,244,933 | 1/1981 | Shibazaki et al. | 423/430 |
| 4,824,654 | 4/1989 | Ota et al. | 423/430 |
| 4,888,160 | 12/1989 | Kosin et al. | 423/432 |
| 5,164,172 | 11/1992 | Katayama et al. | 423/432 |
| 5,230,734 | 7/1993 | Kumasika et al. | 106/464 |
| 5,232,678 | 8/1993 | Bleakley et al. | 423/432 |

FOREIGN PATENT DOCUMENTS

| | | |
|---|---|---|
| 53-94920 | 8/1978 | Japan . |
| 56-135220 | 8/1981 | Japan . |
| 63-256514 | 4/1987 | Japan . |
| 2302317 | 12/1987 | Japan . |
| 63-89705 | 4/1988 | Japan . |
| 90414304 | 12/1990 | Japan . |
| 4295010 | 3/1991 | Japan . |
| 04321515 | 4/1991 | Japan . |
| 91210498 | 7/1991 | Japan . |
| 6743499 | 9/1967 | United Kingdom . |

*Primary Examiner*—Steven P. Griffin
*Assistant Examiner*—Stuart L. Hendrickson
*Attorney, Agent, or Firm*—Finnegan, Henderson, Farabow, Garrett & Dunner, L.L.P.

[57] ABSTRACT

Fine-grained aragonite precipitated calcium carbonate is produced on a commercial scale by seeding with a coarse-grained aragonite precipitated calcium carbonate. The coarse-grained seeding material is produced by interrupting, after the production of 0.1 to 0.6 g/L min. of calcium carbonate, the supply of carbon dioxide to the quicklime slurry early in the reaction to allow subsequent nucleation of the crystals and then continuing the supply of carbon dioxide at reaction rates of 0.1 g/L min. to 0.6 g/L min. This coarse-grained seeding material has a Blaine surface area which may be less than 30,000 cm$^2$/g, the solids of which are 35 to 70 weight percent aragonite, and is added to subsequent batches as a slurry at about 1 weight percent, based on the total weight of the slurry of the material to be seeded. For the seeded batches, carbonation is carried out at reaction rates of up to 1.8 g/L min. at the commercial scale resulting in fine-grained aragonite product. This final seeded product need not be ground, has solids in which the weight percent of aragonite is greater than 90, has a median particle size between 0.30 to about 0.5 microns, a particle size distribution where about 60 to 70 weight percent are less than 0.5 micron equivalent spherical diameter, and a Blaine surface area which may be greater than 35,000 cm$^2$/g.

9 Claims, 2 Drawing Sheets

SEEDING OF ARAGONITE CALCIUM CARBONATE AND THE PRODUCT THEREOF

The present invention pertains to precipitated calcium carbonate, and more particularly, to a method for the commercial scale production of fine-grained aragonite precipitated calcium carbonate and to the product developed by this method.

Aragonite is a form of calcium carbonate having needle shaped crystals and physical properties which depend to a large extent on the length of the needles. Some manufactured aragonite consists of dense clusters of needles in which the individual needle length is so small that it cannot be seen even under the optical microscope. This product finds application in pharmaceuticals, in dentifrice, as a filler and as a pigment. It is distinguishable from calcite, the stable form of precipitated calcium carbonate, by analytical tests such as X-ray diffraction measurements or by the Mohr salt test.

Some aragonite can now be manufactured in crystal sizes up to needle lengths of greater than 50 microns. These larger size aragonite can be used as a filter aid, in cosmetics, as a filler, and as a replacement for mineral powders. The length of the aragonite needle can to some extent be varied to suit any particular application. For example, as a filter aid for raw sugar liquors, needle lengths in the range of 10–25 microns are preferred, whilst for fillers and other applications, a smaller particle size may be required.

In paper manufacture, calcium carbonate may be used both in coating applications and as a filler which is applied to the paper to increase the brightness and flexibility and to improve the printability thereof. If used as a filler, the main advantages are improved brightness, opacity, and fiber replacement. If used in a coating application, the precipitated calcium carbonate pigments are applied to the paper by coating the paper with an aqueous slurry containing the precipitated calcium carbonates and an adhesive.

The calcium carbonate used as a filler pigment or in a coating application in the manufacture of paper may be in the aragonite or calcite form and may be precipitated calcium carbonate, where the calcium carbonate pigment is manufactured by controlled chemical reactions. This manufacturing process for precipitated calcium carbonate can involve a slaking step where lime and water are mixed together to form a slurry followed by a carbonation step where the slurry is transferred to a carbonator and carbon dioxide gas is applied to precipitate the calcium carbon out of the slurry. The slurry is then subjected to a screening process to remove impurities, and then transferred to storage or to the paper mill for final processing for the desired application.

In the application of the precipitated calcium carbonate in the coating of paper, the calcium carbonate is usually prepared in a fine particle size where the median particle size is between 0.3 and 0.5$\mu$, then dewatered, and shipped either as a dry product or as a high solids slurry to a paper manufacturer who either reslurries the dry product by admixing it with a suitable amount of an adhesive in sufficient water to give the desired consistency, or uses this high solids slurry "as is".

Examples of the prior art pertaining to the precipitation of calcium carbonate to obtain an aragonite form thereof or to the precipitation of a calcium carbonate composition are disclosed in U.S. Pat. Nos. 3,627,480; 3,669,620; 3,869,299; 4,244,933; 4,824,654; 5,230,734; and 5,232,678; and in Japanese Patent Nos. 09181286; 91210498; 7894920; 63256514; 8889705; and 2302317. These methods do not involve a seeding material.

Precipitated calcium carbonate generally is preferred over ground calcium carbonate in paper production as filler or coating pigments in that the morphology, the size, and the size distribution of the particles can be controlled. These features are important when used in the paper making industry. The demand for precipitated calcium carbonate has increased. Ideally, the production rate for producing precipitated calcium carbonate should be increased to meet this demand.

One of the problems with the current precipitation processing of aragonite is believed to be related to the nucleation phenomenon in that it is difficult to control the nucleation behavior. If the nucleation rate is too low, the product batches may be inconsistent with regard to the percent of aragonite in the precipitated product, and too few nuclei are produced resulting in large elongated crystals which require a grinding process in order to obtain the desired size and particle size distribution for paper-making applications. The inherent, elongated shape of aragonite already causes a problem with regard to at least viscosity, and the large elongated crystals as a result of "too low" a nucleation rate, compound the viscosity and the pH problems associated with the present day precipitation processing of the aragonite form of calcium carbonate. Also, if nucleation rates are too low, the subsequent growth of the crystals will produce a coarse particle.

Seeding is known to be an effective and commonly employed method for controlling nucleation. This technique is well known in the crystal growing art, in general, and also is known in the preparation of precipitated calcium carbonate.

U.S. Pat. No. 3,197,322 discloses such a seeding process for the precipitation of calcium carbonate. This process involves (a) the forming of an aqueous slurry by admixing various parts of calcium carbonate ($CaCO_3$) crystals from a previously prepared batch; calcium chloride ($CaCl_2$); and slaked calcined dolomite which is a mixture of magnesium oxide ($Mg(OH)_2$) and calcium oxide ($Ca(OH_2)$); (b) carbonating the aqueous slurry; and (c) filtering, washing, and pulping the product. The seed mixture which is the previously carbonated mixture containing $CaCO_3$ crystals is made according to the same procedure as the seeded mixture. The final slurry consists of between 15 to 80 weight percent of aragonite having a median size between 0.8 and 1.2 microns, between about 25 and 40 weight percent smaller than 0.6 micron, at least 13 weight percent greater than 2.0 microns, and has a viscosity of about 4.0 poises at room temperature when diluted to about a 65 percent total solids. These properties and/or characteristics may be desirable for paper coating, however, in some applications requiring "high gloss", this product is not suitable in that only about 50 weight percent of the aragonite solids is less than 0.5 microns. The mass fraction of the crystals needs to be $\geq 50\%$ less than 0.5 microns for high gloss applications.

Additional prior art methods relating to the precipitation of aragonite through seeding are U.S. Pat. No. 5,164,172 and Japanese Patent Nos. 04321515; 89167267; 04224110; and 81135220. Most of the disclosures of this prior art relate to methods to produce long needles of aragonite for non-paper applications, and almost all involve the use of phosphoric acid prior to carbonation.

The prior art methods for precipitating calcium carbonate into aragonite form with seeding material has still proven to be unsatisfactory, especially when employed on the commercial scale in that the performance of the product from the different batches tends to be inconsistent; and the nucleation rates generally are too low resulting in larger crystals since few nuclei are produced, which means that the final product has to be ground. Since there are problems in the prior art processes, the production and capital costs have increased to uneconomical levels. Additionally, some kinds of limes used in the precipitation process fail to readily nucleate aragonite.

It is thought by the inventors that these several problems could be rectified by increasing the nucleation rate. If enough aragonite nuclei were generated early in the reaction, the reaction rates could be increased thereby lessening the production and capital costs. An increase in the nucleation rate would result in a decrease in the size of the aragonite needles since size is a function of the nucleation rate. The decrease in the size of the needles would mean that the aragonite does not need to be ground, which, in turn, means that the slurry form of the product has a lower viscosity and a better controlled pH since it is known that the grinding process tends to release lime which increases the viscosity and pH values of the slurry. Eliminating the grinding step removes the need to recarbonate the product to counteract these negative effects brought on by grinding. Thus, the processing process of the precipitated calcium carbonate can be shortened thereby helping to reduce production costs.

SUMMARY OF THE INVENTION

It has been found that satisfactory results are obtained by first preparing a seeding material through a precipitated calcium carbon process involving carbonation, and using this seeding material in a precursor process for the commercial scale production of an aragonite form for use in a paper making process.

The present invention is directed to a method for the commercial scale production of fine-grained aragonite precipitated calcium carbonate (PCC) by seeding with coarse-grained aragonite PCC. For purposes herein related to the invention, fine-grained aragonite can be defined as having mass fraction particles less than $0.5\mu$ being greater than or equal to 50%, preferably 60 to 80 weight percent of solids, and a median particle size between 0.3 and $0.5\mu$, and preferably between 0.3 and $0.4\mu$. Coarse-grained aragonite can be defined as having mass fraction particles less than $0.5\mu$ being less than 50% and a median particle size greater than $0.5\mu$. The method of the invention first involves the production of the coarse-grained seeding material which has a Blaine surface area less than 30,000 $cm^2/g$. This coarse-grained seeding material is produced by interrupting the supply of carbon dioxide to the quicklime slurry early in the reaction, after the production of about 0.1 to about 0.6 g/L min. of calcium carbonate for a short period of time (1 to 5 minutes) and then continuing the carbonation step at a reaction rate of about 0.1 to about 0.6 g/L min. This coarse-grained seeding material has a Blaine surface area less than 30,000 $cm^2/g$, the solids of which are 40 to 70 weight percent aragonite. This seeding material is then added to subsequent batches of slaked-lime slurries at about 1 weight percent based on the weight of the slurry. These subsequent batches then become the seeded material. Carbonation of the seeded batches is carried out at significantly higher reaction rates of up to about 1.8 g/L min. at the commercial scale resulting in a fine-grained aragonite product. The concentration of the calcium oxide quicklime (CaO) in the slurry may be about 120 g/L, but concentrations as high as about 200 g/L are possible. The slaking temperature may be about 38° C. to about 90° C. or about 120 to about 210° F.; and the carbonation temperature throughout the carbonation step may be about 50° C. or 120° F. The final fine-grained aragonite product has a weight percent aragonite greater than 90, a median particle size between about 0.30 to about 0.5 microns, a particle size distribution where about 70 weight percent are less than 0.5 microns (e.s.d.), and a Blaine surface area greater than 35,000 $cm^2/g$.

There are several advantages realized by the method of the invention. These are: 1) A high percentage of aragonite is produced in the final seeded product, that is, greater than 90% of the solids in the slurry is aragonite. 2) Higher reaction rates are achieved, which result in an increase in the production rates, which, in turn, lower the capital and operating costs. 3) Shorter aragonite needles are produced. The shorter needles reduce the viscosity of the slurry making post-crystallization processing, such as screening, pumping, dewatering, easier. Most importantly, the shorter needles eliminate the need to grind the final product to achieve the desired particle size characteristic for paper applications. Eliminating the grinding step also minimizes the problems which may be encountered in the unseeded production of aragonite of the prior art.

While the nature of the problems of the prior art is not completely understood, it is theorized that the sand grinding step may liberate the free lime which is present in all precipitated calcium carbonates at tenths of a weight percent level which drives the pH of the slurry up to 10 to 12 by the release of hydroxide ions, and which free lime tends to increase the viscosity of the slurry to a Brookfield viscosity of about 1000 cps by bridging the molecules of the dispersant agent in slurry with the calcium ions. The pH values of 10 to 12 for the slurry may be unacceptable for most paper applications which generally require a pH of 9 to 10, and the high viscosity value may make the slurry unpumpable for storage and/or shipping purposes.

The present invention is directed to a process for producing a coarse-grained aragonite precipitated calcium carbonate, for use as a seeding material, the steps comprising:

slaking calcium oxide quicklime in a continuous slaking process to produce a slaked lime slurry;

carbonating said slurry for a relatively short period of time to start the reaction, discontinuing the supply of carbon dioxide gas to said slurry for a period of time to allow nucleation of the aragonite crystals, and continuing to carbonate said slurry until calcium carbonate is again precipitated at a predetermined reaction rate and until the pH of said slurry is less than about 8.5.

The invention is further directed to a coarse-grained product having about 30 to about 70 weight percent aragonite solids and a Blaine surface area of less than about 30,000 $cm^2/g$ to be used as seed material.

The invention is still further directed to a process for producing a fine-grained aragonite product where the steps comprise introducing a coarse-grained product into a slurry of calcium carbonate material to be seeded, and carbonating the slurry until calcium carbonate is precipitated at a reaction rate about equal to or greater than the reaction rate which produced the coarse-grained aragonite product.

The invention is still further directed to a fine-grained aragonite product having a mean particle size less than 0.50 microns, a particle size distribution where about 70 weight percent are less than 0.5 micron equivalent spherical diameter, a weight percent solids of aragonite greater than 90, and a Blaine surface area greater than 35,000 $cm^2/g$.

These and other objects of the present invention will be better appreciated and understood by those skilled in the art from the following description of the invention and the claims.

BRIEF DESCRIPTION OF THE INVENTION

DETAILED DESCRIPTION OF THE INVENTION

The present invention is directed to the production of aragonite through a precipitated calcium carbonate procedure by using a seeding technique. The overall process is divided into two parts: 1) the production of seeding material (i.e., precipitated calcium carbonate that is used to seed subsequent batches); and 2) seeded product batches (batches that receive the seeding material before the carbonation step).

In the examples herein, "high calcium quicklime" was used. This "high calcium quicklime" has available calcium oxide greater than 92%, that is, greater than 92% of the calcium oxide was in reactive form. In the description of the invention, precipitated calcium carbonate may be in abbreviated form and appearing as "PCC".

In the examples, the seeding addition was based on the total volume or weight of the seeded batch, and sufficient seeding was added to the material to be seeded to achieve 1 weight percent of the material to be seeded. For example, if the batch to be seeded was 16,000 gallons at 20% solids, then 160 gallons of seeding material at 20% solids would have been added to the batch to be seeded. Therefore, the amount of seeding material and the percentage of solids used in the batches to be seeded was about 1 weight percent of the total volume or weight of the slurry of the batch to be seeded at the same percentage solids. If the percent solids of the seeding batch and batch to be seeded are different, then the ratio of the percent solids can be used to adjust the volume of the seeding added to the batch to be seeded.

Production of Seed Material
General Procedure

Figure 1:
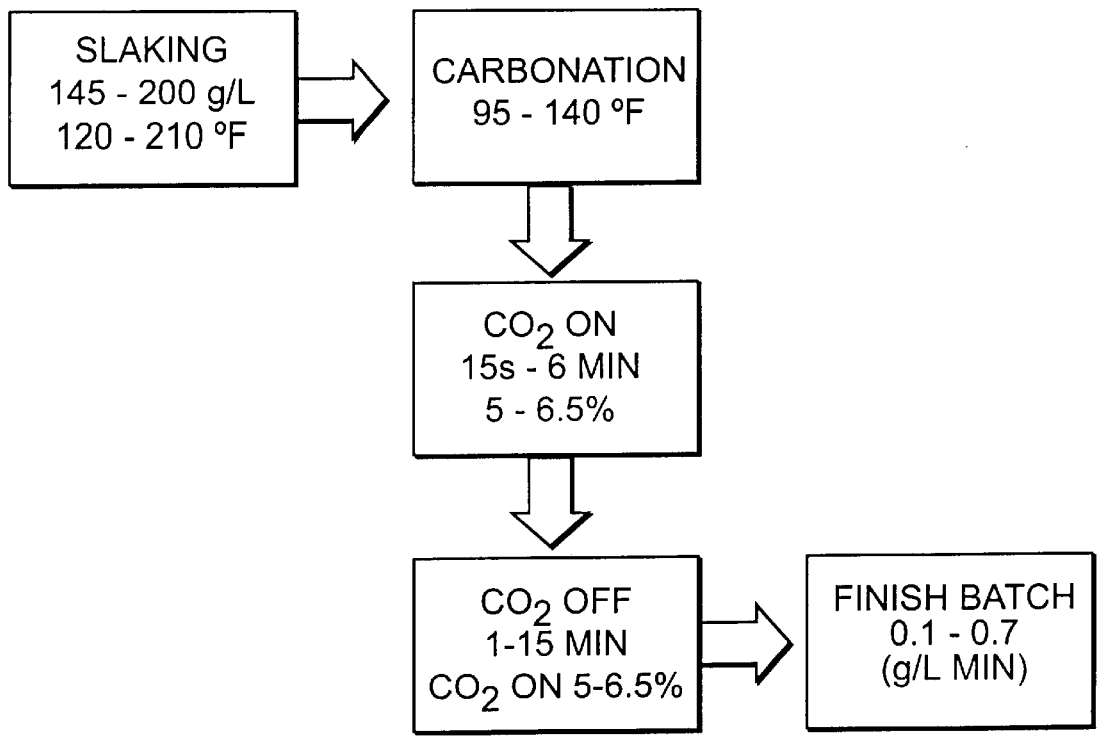
FIG. 1 is a schematic flow chart of the process for producing seeding material used in the seeded batches.

The general procedure for making the seeding material is shown in FIG. 1, and is as follows:

(1) Slake about 145 to about 200 grams/liter, preferably 180 grams/liter, (expressed as calcium carbonate equivalents where $CaCO_3$ equiv.=$Ca(OH)_2$) of calcium oxide quicklime (CaO) at about 120° F. to 0.74 about 210° F., preferably 180° F., in a continuous slaking process, which is known in the art as being a continuous flow during the hydration reaction process as opposed to a batch process.

(2) Screen the slaked lime $(Ca(OH)_2)$ slurry at about 60 to about 120 mesh, preferably about 120 mesh. (This is equivalent to about 250 to about 125 micron size opening.) This resultant slurry may have a "low solids" content ranging from 12 to 20%.

(3) Transfer this screened slurry to a lime tank, and during this transfer heating the slurry at about 95° F. to about 140° F., preferably 120° F., by passing the slurry through a heat exchanger so that the temperature of the slurry about equals the desired temperature of the carbonation step, which desired temperature is determined by the desired type and size of the product.

(4) Carbonate the slurry in a reactor which is equipped with an agitator for mixing the slurry and which agitator is equipped with a device which disperses the gas entering the bottom of the reactor. In the carbonation step, the reaction is exothermic, which may tend to increase the temperature of the slurry slightly. The gas stream contains about 5 to 6.5% carbon dioxide in air, preferably 6.0%. The carbon dioxide gas is introduced into the bottom of the reactor for about 15 seconds to 6 minutes in order to start the nucleation of the aragonite and in amounts sufficient to produce a low reaction rate of about 0.1 to about 0.7 g/L min., preferably 0.45 g/L min. of calcium carbonate $(CaCO_3)$. This reaction rate can be measured by periodically measuring calcium hydroxide concentration by titration to phenophthalein endpoint with hydrochloric acid, where a pH of about 8.3 indicates the endpoint of the reaction. The gas is discontinued for about 1 to 15 minutes, and then introduced again into the reactor in amounts sufficient to again produce a low reaction rate of about 0.1 to about 0.7 g/L min., preferably 0.45 g/L min. of calcium carbonate $(CaCO_3)$. Prior to the carbonation step, the pH of the slurry may be about 11.5 to about 12.0, and it remains in this range until all solid $Ca(OH)_2$ is consumed. The pH then falls off rapidly to about 8.5 or to about 8.3, as $Ca(OH)_2$ in solution is consumed. After the endpoint of the reaction is reached, the carbon dioxide gas is still delivered into the reactor for an additional 10 to 60 minutes (overcarbonation) in order to minimize the residual lime which may be about 0.2 to about 0.7 weight percent solids. "Overcarbonation" is defined herein as that period of time in which carbon dioxide gas/air mixture is still delivered into the slurry after the pH of the slurry reaches at least 8.3, indicating that the PCC reaction endpoint has been reached.

(5) Transfer the precipitated calcium carbonate slurry to a batch storage tank.

(6) Screen the slurry through a 325 mesh sieve (about 45 micron size).

(7) Transfer the screened slurry to a storage tank for subsequent use in the commercial scale production of aragonite.

This resultant seeding material in slurry form contains between about 15 to 20 weight percent dry solids, based on the weight of the slurry. These solids are between 35 and 70 weight percent aragonite, as determined by X-ray diffraction (XRD) analysis, with the remainder of the solids being made up of coarse crystallite calcite. Knowing the percentage of the aragonite in this seeding material is important in determining the amount of seeding material needed to be added to the subsequent product batches to be seeded in order to achieve the desired final product characteristics. It is believed by the inventors that consistency of the characteristics of the final product, such as weight percent aragonite, particle size, and particle size distribution of the final aragonite depend to a great extent on the size, the weight percentage amount, the reaction rate, and the weight percent of the solids in this seeding material.

Commercial Scale Seeding Material Batches

The above procedure was carried out for Examples 1–5.

EXAMPLE 1

Calcium oxide (CaO) was slaked at 180 grams/liter at 180° F. in a continuous slaking process. The resultant slurry was screened at 60 mesh, and transferred to the lime tank while the temperature of the slurry was adjusted to the initial carbonation temperature of 120° F. by passing the slurry through a heat exchanger. The slurry was then carbonated at 120° F. for 300 seconds using a gas stream containing 6.5% carbon dioxide in air or using an amount of $CO_2$ to produce 0.46 g/L min. of $CaCO_3$, then cut off for 15 minutes. Carbonation was resumed using an amount of gas sufficient to produce another 0.46 g/L min. of $CaCO_3$, and continued until the pH of the slurry decreased below 8.5, indicating that the reaction endpoint had been reached. At this time, overcarbonation of the slurry was carried out for 60 minutes. The PCC batch was transferred to the storage batch tank, screened through the 325 mesh sieve, and then transferred to the storage tank. The seeding material thus produced had a Blaine surface area of 33,000 $cm^2/g$ and was 16.2 weight percent solids, based on the weight of the slurry, with 65 weight percent of the solids being made up of aragonite with the remainder being calcite. This product is identified as CN6359 in Table 1.

EXAMPLE 2

The same procedure was carried out for this example. CaO was slaked at 158 g/liter at 180° F. in a continuous slaking process, and then screened at 100 mesh. The temperature of the slurry was brought to 120° F. In the reactor, the slurry was carbonated at 120° F. for 15 seconds using a gas stream containing 5.0% carbon dioxide in air or using an amount of $CO_2$ sufficient to produce 0.52 g/Liter min. of $CaCO_3$. After 15 seconds, the $CO_2$ was cut off for 1 minute, whereafter it was resumed again in an amount sufficient to produce 0.52 g/Liter min. of $CaCO_3$. This carbonation step continued until the pH of the slurry decreased below 8.5 indicating that the reaction endpoint had been reached. Overcarbonation of the slurry was carried out for 60 minutes. The seeding material thus produced had a Blaine surface area of 30,300 $cm^2/g$, and was about 14.4 weight percent solids, based on the weight of the slurry, with 67 weight percent of the solids made up of aragonite. This product is identified as CN7047 in Table 1.

EXAMPLE 3

This example followed the same procedure as Example 1. CaO was slaked at 150 g/liter at 180° F. in a continuous slaking process, and then screened at 100 mesh. The slurry temperature was raised to 122° F. In the reactor, the slurry was carbonated at 122° F. for 15 seconds using a gas stream containing 5.0% carbon dioxide in air or using an amount of $CO_2$ sufficient to produce 0.53 g/Liter min. of $CaCO_3$. Carbonation was cut off for 3 minutes, and then resumed using an amount of gas sufficient to produce 0.53 g/L min. of $CaCO_3$, and continued until the pH of the slurry reached below 8.5. Overcarbonation of the slurry was carried out for another 60 minutes. The seeding material thus produced had a Blaine surface area of 24,600 $cm^2/g$ and 13.7 weight percent solids, based on the weight of the slurry, with 48 weight percent of the solids made up of aragonite. This product is identified as CN7196 in Table 1.

EXAMPLE 4

This example followed the same procedure as Example 1. CaO was slaked at 146 grams/liter at 120° F. in a continuous slaking process, and then was screened at 100 mesh. The temperature of the slurry was brought to 124° F. The slurry was carbonated at 124° F. for 40 seconds using a gas stream containing 4.0% $CO_2$ in air or using an amount of $CO_2$ to produce 0.56 g/Liter min. of $CaCO_3$. Carbonation was cut off for 10 minutes, and then resumed until 0.56 g/L min. of $CaCO_3$ was produced. Carbonation continued until the pH decreased below 8.5. Overcarbonation was carried out for 60 seconds. The seeding material thus produced had a Blaine surface area of 24,400 $cm^2/g$ and was about 13.4 weight percent solids, based on the weight of the slurry with 44 weight percent of the solids being made up of aragonite. This product is identified as CN7816 in Table 1.

EXAMPLE 5

This example followed the same procedure as Example 1. CaO was slaked at 150 grams/Liter at 180° F. in a continuous slaking process, and then screened at 60 mesh. The temperature of the slurry was brought to 118° F. The slurry was carbonated at 118° F. for 1 minute using a gas stream containing 5.0% $CO_2$ in air or using an amount of $CO_2$ to produce 0.54 g/L min. of $CaCO_3$. Carbonation was cut off for 5 minutes, and then resumed until 0.54 g/L min. of $CaCO_3$ was produced. Carbonation continued the pH decreased below 8.5. Overcarbonation was carried out for 60 minutes. The seeding material produced had a Blaine surface area of 20,300 $cm^2/g$, and was about 13.7 weight percent solids, based on the weight of the slurry, with 34 weight percent of the solids being made up of aragonite. This product is identified as CN7629 in Table 1.

The properties of these five seeding batches are summarized in Table 1. All seeding batches were made using variations of the same method in which the $CO_2$ was cut off shortly after the reaction was initiated, and then the reaction was restarted after a few minutes.

TABLE 1

Aragonite Seeding Batch Data (Commercial Scale)

| Batch No. | Weight Percent Aragonite (XRD) | Concentration (g/L) | Reaction Rate (g/L min) | Blaine Surface Area ($cm^2/g$) | Method |
| --- | --- | --- | --- | --- | --- |
| CN6359 | 65 | 180 | 0.46 | 33,000 | 300 s., 6.5%, 15 m. |
| CN7047 | 67 | 158 | 0.52 | 30,300 | 15 s., 5.0%, 1 m. |
| CN7196 | 48 | 150 | 0.53 | 24,600 | 15 s., 5.0%, 3 m. |
| CN7816 | 44 | 146 | 0.56 | 24,400 | 40 s., 4.0%, 10 m. |
| CN7629 | 34 | 150 | 0.54 | 20,300 | 1 m., 5.0%, 5 m. |

The notation in the "Method" column in Table 1, for example, "300 s., 6.5%, 15 m." for batch No. 6359, means that at the start of the carbonation step the $CO_2$ was on for 300 seconds at a concentration of 6.5%, and then off for 15 minutes, and then restarted at a 6.5% concentration.

It was observed that the weight percent aragonite used to seed the product batches in both the laboratory experiments and at the commercial scale had a marked effect on the percent aragonite in the final seeded product. Therefore, it was believed that it was important to have some method of estimating the aragonite percentage in the material to be seeded at least when produced commercially. The standard quality assurance test for aragonite at the plant level is the Mohr salt test where iron ammonium sulfate is added to the final product and the change in color from white to green is used to indicate the presence of aragonite. As presently employed, this is a qualitative technique. A semi-quantitative method thought to be readily useful in the plant came from the observation that there is a relatively good correlation between the percent aragonite in the seeding material and its Blaine surface area. These values from Table 1, that is, the weight percent aragonite (Column 2) and the Blaine surface area (Column 5) can be plotted to produce a linear relationship. This linear relationship, based on the weight percent aragonite and the Blaine surface area of the seeding material, can then be used to determine the percent aragonite needed to seed subsequent batches. This correlation was thought to be adequate for production purposes, particularly in view of the fact that both the weight percentage of the solids of the CaO and the reaction rates in the above examples for the seeding material batches are not fixed. This linear relationship allows the percent aragonite in the seeding material to be estimated to within 5% to 6% in order to better control the actual amount of seed material added to the subsequent seeded batches. Until this correlation of the Blaine surface area and the percent aragonite obtained in the seeding material of the above Examples 1–5 was realized, the amount of seed material used to produce the seeded product was fixed at 1 weight percent of the total weight of the slurry of the material to be seeded, as explained hereinabove.

Examples 6–12 below employ a seed material whose amount was 1 weight percent of the total weight of the slurry of the batch to be seeded.

Production of Seeded Product

General Procedure

Figure 2:
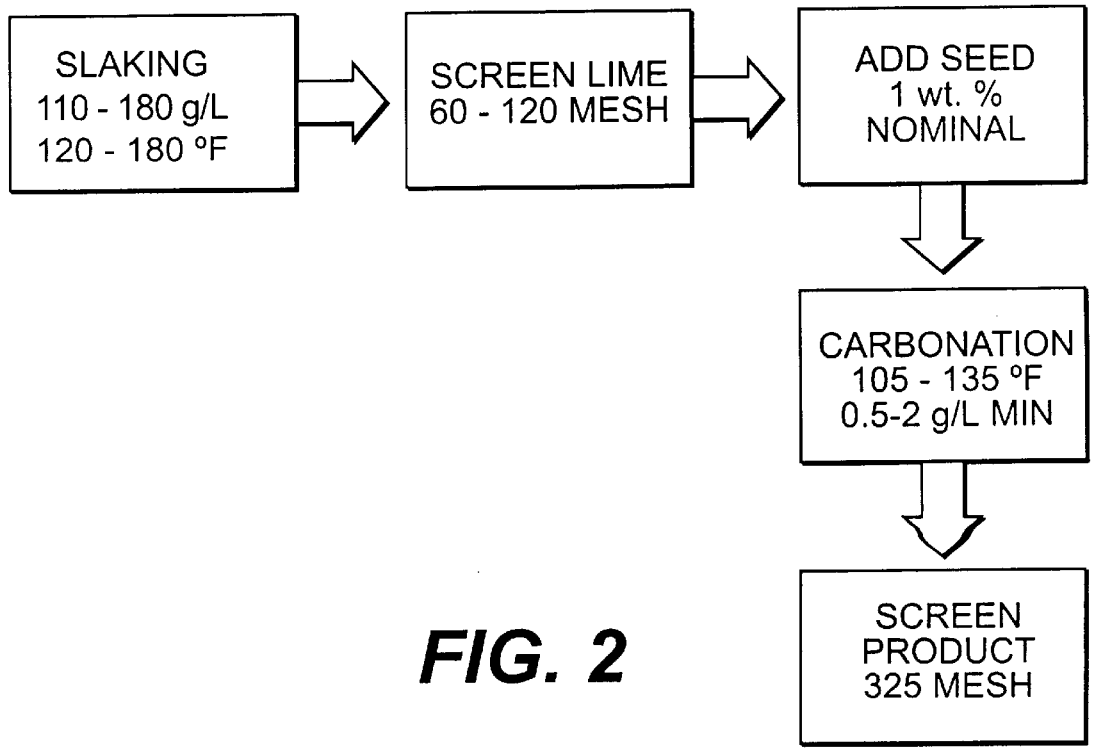
FIG. 2 is a schematic flow chart of the process for producing seeded batches by using the seeding material.

The general procedure for making the seeded product from the seed material of Examples 1–5 is shown in FIG. 2, and is as follows:

(1) Slake about 110 to about 180 grams/liter, preferably 160 grams/liter, (expressed as calcium carbonate equivalents) of calcium oxide quicklime (CaO) at about 120° F. to about 180° F., preferably 120° F., in a continuous slaking process.

(2) Screen the slaked lime ($Ca(OH)_2$) slurry at about 60 to about 120 mesh (250 to 125 micron opening size), preferably about 120 mesh.

(3) Transfer this screened slurry to a lime storage tank, while heating the slurry at about 95° F. to about 140° F., preferably 120° F. This heating step is achieved by passing the slurry through a heat exchanger during its transfer to the lime storage tank.

(4) Transfer the slurry to a reactor, and simultaneously introduce the seeding material in amounts of about 0.1 to about 5.0 weight percent, preferably about 1 weight percent, based on the total weight of the slurry of the material to be seeded. It is now known that the greater the percentage of aragonite in the seeding material, the smaller the particle size and the greater the percentage of aragonite in the final seeded product.

(5) Carbonate the slurry in the reactor equipped with an agitator for mixing the slurry and which agitator is equipped with a device which disperses the gas entering the bottom of the reactor. The concentration of the carbon dioxide gas to air in the gas stream is about 10 to 20%, and preferably 18%. The amount of gas mixture introduced is sufficient to produce about 0.1 to about 2.0 g/L min., preferably 1.5 g/L min. of $CaCO_3$ and is pumped into the bottom of the reactor according to well known practice. Carbonation continues until the pH of the slurry decreases from 11.5–12.0 to less than 8.5, indicating that the reaction endpoint has been reached. The slurry is overcarbonated then for about 60 minutes, to minimize the amount of residual lime in the slurry.

(6) Transfer the PCC slurry to a batch storage tank.

(7) Screen the PCC slurry through a 325 mesh sieve (45 micron opening size).

(8) Transfer the slurry to a storage tank for future use in the paper making purpose.

The commercial scale batches of seeded aragonite slurry may contain 10.3–14.5 weight percent solids, based on the total weight of the slurry, of which solids, greater than 85 weight percent, and preferably greater than 90 weight percent, is aragonite. This may be determined by X-ray diffraction analysis (XRD). The remainder of the solids are made up of coarse crystallite calcite. The aragonite has a median particle size less than 0.5 micron, preferably about 0.3 to 0.4 micron, and has a mass fraction where more than 50%, preferably more than 70%, are less than 0.5 micron.

Commercial Scale Seeded Batches

The above general procedure was carried out for Example 6–12. The process data are shown in Table 2, and the aragonite batch mineralogical data are shown in Table 3. In the following Examples 6–12, the amount of seeded material introduced into the material to be seeded was 1 weight percent of the total weight of the slurry to be seeded since the linear relationship of the percent aragonite and the Blaine surface area of the seeding material had not been realized at the time of experimentation.

EXAMPLE 6

CaO was slaked at 156 g/L at 180° F. in a continuous slaking process. The resultant slurry was screened at 100 mesh, and while being transferred to the lime storage tank adjusting its temperature to the initial carbonation temperature of 122° F. by passing it through a heat exchanger. The slurry was transferred to the reactor. The seeding material in an amount of 1 weight percent of the total weight of the slurry of the material to be seeded was introduced into the top of the reactor at the same time the slurry to be seeded was introduced into the reactor. The seeding material was that of Batch No. CN7047 of Table 1 containing 14.4% solids of which 67 weight percent was aragonite. Carbonation was carried out at an initial temperature of 122° F., rising to about 130° F. during the course of the reaction. The concentration of the carbon dioxide gas was about 13%, and at an amount which was sufficient to produce 0.43 g/L min. of $CaCO_3$. Carbonation continued until the pH decreased from about 11.5–12.0 to less than 8.5 indicating the reaction endpoint was reached, which took 360 minutes. Overcarbonation of the slurry continued for an additional 60 minutes. The PCC batch was transferred to the batch tank, was screened through the 325 mesh sieve, and transferred to a storage tank. The final seeded product thus produced had a Blaine surface area of 46,700 $cm^2/g$. The slurry was 14.5 weight percent solids, of which 93 weight percent was aragonite. The unground median particle size was 0.33 micron e.s.d., and the mass fraction less than 0.5 micron e.s.d. as measured by Sedigraph was 77%. This is identified as Batch No. CN7048 in Tables 2 and 3.

EXAMPLE 7

This example was carried out in the same procedure as Example 6. CaO was slaked at 150 g/L at 180° F. and screened at 100 mesh. The temperature of the lime slurry was adjusted to 123° F. The seeding material in an amount of 1 weight percent of the total weight of the slurry to be seeded was introduced into the reactor. The seeding material of Batch No. CN7047 of Table 1 containing 14.4% solids of which 67 weight percent was aragonite. Carbonation was carried out at an initial temperature of 123° F., rising to that of about 130° F., and using a $CO_2$ concentration of 13% in an amount sufficient to produce 1.6 g/L min. of $CaCO_3$. Carbonation continued until the pH of the seeded slurry was less than 8.5 which took 141 minutes. Overcarbonation was carried out for an additional 60 minutes after the pH of the slurry was less than 8.5. The final seeded product had a Blaine surface area of 45,800 cm$^2$/g. The final product slurry was 15 weight percent solids, based on the total weight of the product slurry, of which solids, 97 weight percent was aragonite. The unground median particle size was 0.30 micron e.s.d., and the mass fraction less than 0.5 micron e.s.d. as measured by Sedigraph was 85%. This product is identified as CN7049 in Tables 2 and 3.

EXAMPLE 8

CaO was slaked at 150 g/L at 180° F., and screened at 100 mesh. The temperature of the slurry was adjusted to 122° F., and transferred to the reactor. Aragonite nucleation in the slurry was initiated by the seeding material of batch No. CN7196 of Table 1 into the lime slurry to be seeded. This seeding batch was 13.7 weight percent solids, of which 48 weight percent was aragonite and was introduced in an amount of 1 weight percent of the total weight of the slurry to be seeded. Carbonation was carried out at an initial temperature of 122° F., rising to 130° F., and using a $CO_2$ concentration of 13% in an amount to produce 0.82 g/L min. of $CaCO_3$. The pH was lowered to less than 8.5, which took 183 minutes, and overcarbonation was carried out for an additional 60 minutes. The final seeded product had a Blaine surface area of 37,600 cm$^2$/g. The final seeded slurry contained 13.7 weight percent solids, based on the total weight of the seeded slurry, of which 97 weight percent was aragonite. The ungrounded median particle size was 0.36 micron e.s.d., and the mass fraction less than 0.5 micron e.s.d. as measured by Sedigraph was 74%. This product is identified as CN7197 in Table 2.

EXAMPLE 9

CaO was slaked at 116 g/L at 120° F., and screened at 100 mesh. The temperature of the slurry was adjusted to 122° F., and transferred to the reactor. Aragonite nucleation was initiated by introducing the seeding material of batch No. CN7196 of Table 1 into the lime slurry to be seeded. The amount of seeding material was 1 weight percent of the total weight of the slurry to be seeded. This seeding material was 13.7 weight percent solids, of which 48 weight percent was aragonite. Carbonation was carried out at an initial temperature of 123° F., rising to 130° F., and using a $CO_2$ concentration of 13% in an amount to produce 0.94 g/L/min. of $CaCO_3$. The pH was lowered to less than 8.5, which took 123 minutes, and overcarbonation was carried out for an additional 60 minutes. The final seeded product had a Blaine surface area of 41,000 cm$^2$/g. The final seeded slurry contained about 10.8 weight percent solids, based on the total weight of the seeded slurry, the solids, of which, 95 weight percent was aragonite. The unground median particle size was 0.34 micron e.s.d., and the mass fraction less than 0.5 micron e.s.d. measured by Sedigraph was 73%. This product is identified as CN7198 in Tables 2 and 3.

EXAMPLE 10

CaO was slaked at 113 g/L at 120° F., and screened at 60 mesh. The temperature of the lime slurry was adjusted to 125° F., and then transferred to the reactor. Aragonite nucleation was initiated by introducing the seeding material of batch No. CN7629 of Table 1 into the lime slurry to be seeded. The amount of seeding material was 1 weight percent of the total weight of the slurry to be seeded. This seeding material slurry was 13.7 weight percent of solids, of which 34 weight percent was aragonite. Carbonation was carried out at an initial temperature of 125° F., rising to 130° F. during the reaction, and at a concentration of $CO_2$ of 13% in an amount to produce 0.99 g/L/min. of $CaCO_3$. When the seeded slurry reached a pH of less than 8.5, which took 114 minutes, overcarbonation was carried out for an additional 60 minutes. The final seeded product had a Blaine surface area of 37,400 cm$^2$/g. The final seeded slurry contained 10.6 weight percent solids, based on the total weight of the seeded slurry, the solids of which 93 weight percent was aragonite. The ungrounded median particle size was 0.41 micron e.s.d., and the mass fraction less than 0.5 micron e.s.d. measured by Sedigraph was 65%. This product is identified as batch No. CN7630 in Tables 2 and 3.

EXAMPLE 11

CaO was slaked at 126 g/L at 120° F., and screened at 60 mesh. The lime slurry was adjusted to 118° F., and transferred to the reactor. Aragonite nucleation was initiated by introducing the seeding material of batch No. CN7629 into the lime slurry to be seeded. The amount of seeding material was 1 weight percent of the total weight of the slurry to be seeded. This seeding material slurry was 13.7 weight percent solids, of which 34 weight percent was aragonite. Carbonation was carried out at an initial temperature of 118° F., rising to about 130° F. during the reaction, and using a $CO_2$ concentration of 18% in an amount to produce 1.78 g/L min. of $CaCO_3$. When the pH was reduced to less than 8.5, which took 71 minutes, overcarbonation of the seeded slurry was carried out for an additional 60 minutes. The final seeded product had a Blaine surface area of 44,700 cm$^2$/g. The final seeded slurry contained 11.7 weight percent solids, based on the total weight of the seeded slurry, the solids of which 89 weight percent was aragonite. The unground median particle size was 0.32 micron e.s.d., and the mass fraction less than 0.5 micron e.s.d. measured by Sedigraph was 70%. This product is identified as batch No. CN7631 in Tables 2 and 3.

EXAMPLE 12

CaO was slaked at 150 g/L at 120° F., and screened at 60 mesh. The temperature of the lime slurry was adjusted to 124° F., and transferred to the reactor. Aragonite nucleation was initiated by introducing the seeding material of batch No. CN7816 of Table 1 into the lime slurry to be seeded. The amount of seeding material was 1 weight percent of the total weight of the slurry to be seeded. This seeding material slurry was about 13.7 weight percent solids, of which 44 weight percent was aragonite. Carbonation was carried out at an initial temperature of 120° F., rising to 130° F. during reaction, and at a $CO_2$ concentration of 13% in an amount to produce 0.89 g/L/min. of $CaCO_3$. When the pH of the seeded slurry was reduced to less than 8.5, which took 169 minutes, overcarbonation was carried out for an additional 60 minutes. The final seeded product had a Blaine surface area of 45,500 cm$^2$/g. The final seeded slurry contained 13.7 weight percent solids, based on the total weight of the seeded slurry, the solids of which 93 weight percent was aragonite. The unground median particle size was 0.4 micron e.s.d., and the mass fraction less than 0.5 micron e.s.d. as measured by Sedigraph was 69%. This is identified in Tables 2 and 3 as batch No. CN7817.

TABLE 2

Aragonite Batch Process Data

| Batch No. | Concentration (g/L) | Slaking Temp. (F.) | Initial Carb. Temp. (F.) | Overall Reaction Rate (g/L/min.) | Elapsed Time (Minutes)* |
|---|---|---|---|---|---|
| CN7048 | 156 | 180 | 122 | 0.43 | 360 |
| CN7049 | 150 | 180 | 123 | 1.06 | 141 |
| CN7197 | 150 | 180 | 122 | 0.82 | 183 |
| CN7198 | 116 | 120 | 122 | 0.94 | 123 |
| CN7630 | 113 | 120 | 125 | 0.99 | 114 |
| CN7631 | 126 | 120 | 118 | 1.78 | 71 |
| CN7817 | 150 | 120 | 124 | 0.89 | 169 |

*Excluding Over-Carbonation

TABLE 3

Aragonite Batch Mineralogical Data

| Batch # | % Aragonite (XRD) | Median Particle Size, $\mu$ (Unground)e.s.d. | % < 0.5 $\mu$ (Unground)e.s.d. | Blaine Surface Area (cm$^2$/g) |
|---|---|---|---|---|
| CN7048 | 93 | 0.33 | 77 | 46,700 |
| CN7049 | 97 | 0.30 | 81 | 45,800 |
| CN7197 | 97 | 0.36 | 74 | 37,600 |
| CN7198 | 95 | 0.36 | 73 | 41,000 |
| CN7630 | 93 | 0.41 | 65 | 37,400 |
| CN7631 | 89 | 0.32 | 70 | 44,700 |
| CN7817 | 93 | 0.40 | 69 | 45,500 |

These seven seeded batches of PCC containing aragonite were produced in the assignee's PCC plant in Canton, N.C.

The concentration was nominally fixed at a 150 g/L target for the first three batches and a slaking temperature of 180° F. Initial carbonation temperature was nominally targeted at 122° F. The next three batches were run at low solids and a low slaking temperature in order to lower the viscosity to levels which would allow the product to be better screened at 325 mesh, and, thereby improve brightness. The throughput and recovery/reject ratio of the slurry is better at lower viscosity values. Attempts were made to fix the overall reaction rate in batches CN7049, 7197 and 7198, however, considerable variation in the reaction rates for these three samples occurred. This is due, in part, to variations in the $CO_2$ concentration of the source, which source is the flue gas from the host paper mill lime kiln where the $CO_2$ gas is impure, and also, in part, to the increases in the viscosity of the slurry which reduced the efficiency of the reaction. The reason for this increase in viscosity of the slurry for these three batches is complicated. Factors include temperature, surface area, particle size and shape.

Figure 3:
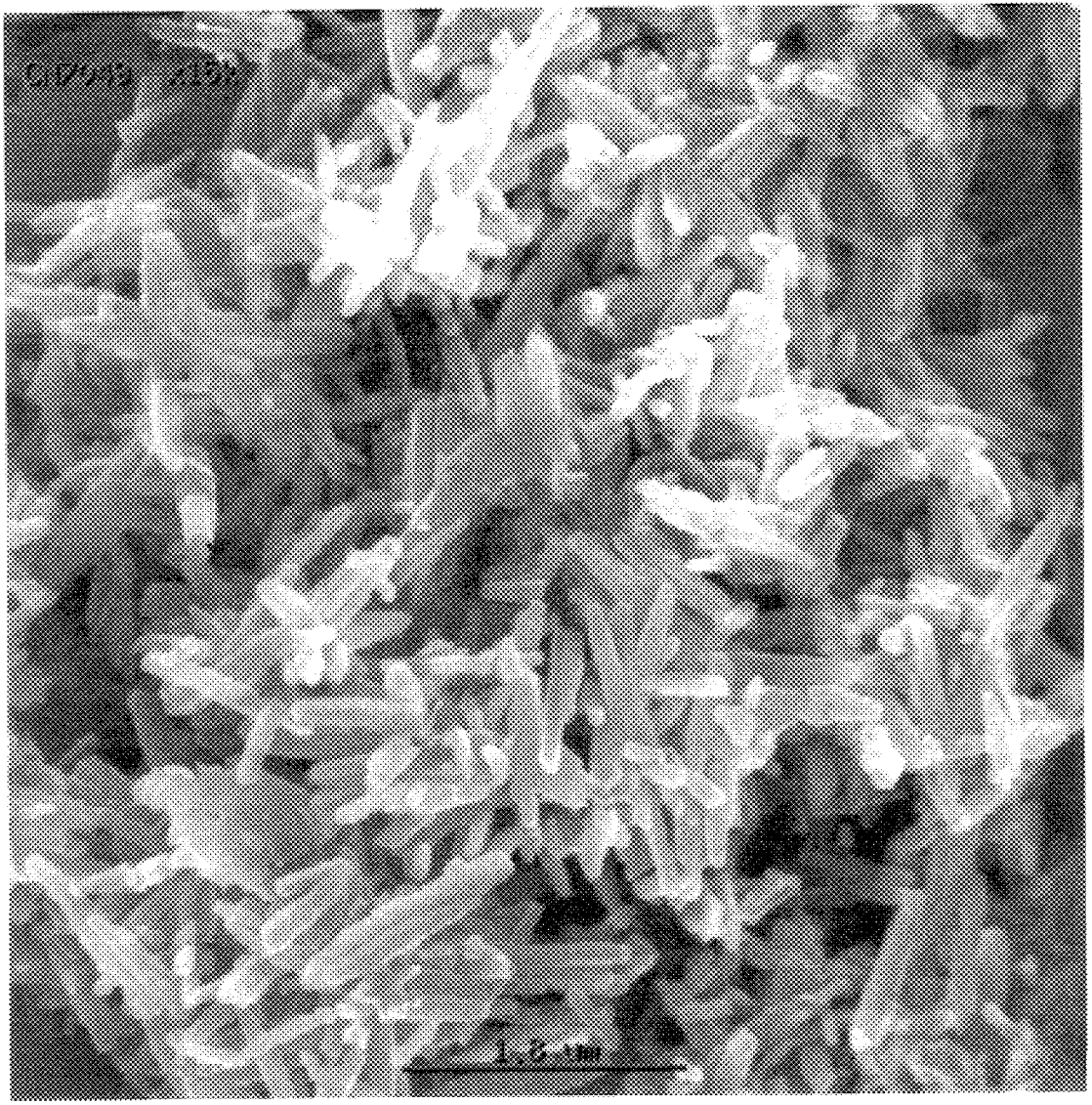
FIG. 3 is a SEM photo of seeded batch product No. CN7049.

The final aragonite product produced by the seeding method of the invention is typically observed to be present as 1 to 2 micron "bundles" of agglomerated needles. The bundles are readily separated during dewatering into the shorter (<1.0 micron) needles of which they are made, yielding a product with a median particle size in the 0.3 to 0.4 micron e.s.d. size range. An example of these "bundles" is shown in FIG. 3 for batch No. CN7049. Arrow No. 2 points to one of these "bundles", and arrow No. 1 points to a single needle which measures less than 0.5 micron on the 1.8 micron scale in the SEM photo of FIG. 3.

The first batch (CN7048) was run at a reaction rate similar to those employed in the unseeded batches of Examples 1–5 for comparison purposes. These unseeded batches of aragonite of Examples 1–5 yielded a product in which solids 67% aragonite, with the remainder made up of coarse grained (>2.0$\mu$) calcite. The seeded batches of Examples 6–12, in contrast, yielded solids on an average which were about 95% aragonite as measured by XRD (Table 3). Comparison of the aragonite percentages in Tables 1 & 3 seems to indicate that a consistent product cannot be produced without seeding. The precipitation part of the process for the seven seeded batches was under control, which is considered by the inventors as being a necessary condition for producing consistent product.

Samples taken at 15 minute intervals throughout reaction CN7048 (aragonite) were measured using both XRD and titration of $Ca(OH)_2$. This provided a set of standards of known $CaCO_3/Ca(OH)_2$ ratio which indicated that the XRD analyses were accurate to within 5% in most cases. Based on this finding, it was decided that the use of X-ray diffraction, which is standard practice for determining percent solids in admixtures, is a practical way to determine the weight percent aragonite in the products of the invention.

Unlike the case for seeding material, it appeared that the surface area of the seeded batch did not correlate with the % aragonite in the product. Therefore, knowing the Blaine surface area seemed not to be an adequate quality control measurement for production purposes. This aside, a useful minimum target of a Blaine surface area of 30,000 cm$^2$/g for the seeding material, and a Blaine surface area of 38,000 cm$^2$/g for the seeded product may be assumed.

Aragonite percentage of the solids appears to be most closely associated with either slaking temperature or reaction rate. The limited dependence of the reaction rate on other product characteristics indicates that there is little or no detrimental effect with increase in reaction rate in seeded batches, a matter of considerable importance for capital costs and production rates. That is, higher reaction rates do not degrade produce characteristics and, therefore, performance. Faster reaction rates equal higher production where twice as many tons per unit time can be produced.

Referring again to the seeded material of Table 2, the variation of % aragonite with slaking temperature may be of significance because the latter appears to correlate with the particle size parameters. Two of the batches which were slaked at 180° F. produced a product having 97% aragonite, which is considered as being considerably "pure". Those slaked at 120° F. yielded a less pure product, although only marginally so. This change in slaking temperature to 120° F. was made in an attempt to see if slaking temperature affected the brightness of the product. It was shown that the higher slaking temperature of 180° F. did decrease the brightness of the product about 0.7 brightness units (TAPPI). Different slaking conditions may also have an effect on aragonite nucleation rates, because it changes the surface area of slaked lime particles. A positive correlation between weight percent aragonite and % <0.5µ, seems to reflect the fact that a higher surface area of slaked lime results in higher nucleation rates, yielding a purer product with a finer particle size. Since the difference in % aragonite of the seeded material of Tables 2 and 3 is minimal, it is felt that the slaking temperature can be manipulated to adjust particle size within a narrow range.

The solid concentration of the Examples 6–12 seems to have an effect on the product characteristics, although not as pronounced as the slaking temperature. It appears that the combination of low slaking temperatures, low solids, and low percentages of the seeding material to be added to the material to be seeded would be most effective to coarsen the seeded product, whereas the combination of high slaking temperatures, high solids, and high percentages of the added seeding material would be most effective to make the product finer.

The weight % seeding material added to the seeded batches seems to also correlate with particle size, and is a variable that can easily be manipulated to control product size. The thing to be noted is that the variables may be changed in the process of the invention to produce the desired characteristics of the final seeded slurry and, thus, the final seeded product.

The above examples are illustrative of the invention, and are not to be considered as being limited to the precise embodiments described and shown.

While the present invention has been particularly set forth in terms of specific embodiments thereof, it will be understood in view of the instant disclosure, that numerous variations upon the invention are now enabled to those skilled in the art, which variations reside within the scope of the invention. Accordingly, the invention is broadly construed, and limited only by the scope and spirit of the claims now appended hereto.

What is claimed is:

1. A process for the production of aragonite, comprising:

introducing first precipitated calcium carbonate aragonite particles, having a mass fraction less than 0.5 microns being less than 50 weight percent of solids, into a slaked lime slurry where the total weight of first aragonite particles is about 0.1 to about 5.0 weight percent of the total weight of the slaked lime slurry; and carbonating the slaked lime slurry to create precipitated calcium carbonate solids comprising second precipitated calcium carbonate aragonite particles less than 0.5 microns being greater than or equal to 50 weight percent.

2. A process for the production of aragonite according to claim 1, wherein first aragonite particles have a median particle size greater than 0.5 microns and second aragonite particles have a median particle size between 0.3 and 0.5 microns.

3. A process for the production of aragonite according to claim 1, wherein the solids comprise 90 percent or greater aragonite.

4. A process for the production of aragonite according to claim 1, wherein carbonating the slaked lime slurry is performed at a rate to produce from about 0.1 grams to about 2.0 grams calcium carbonate per liter in the slaked lime slurry per minute and until the pH of the slaked lime slurry is less than about 8.5 pH.

5. A process for the production of aragonite according to claim 4, wherein carbonating the slaked lime slurry is performed at a reaction rate of about 1.8 g/L min.

6. A process for the production of aragonite according to claim 1, wherein the second aragonite particles have a mean particle size less than 0.50 microns, and a particle size distribution where about 70% weight are less than 0.5 micron.

7. A process for the production of aragonite according to claim 1, wherein carbonating the slaked lime slurry is performed using carbon dioxide gas at a concentration of about 10% to about 20%.

8. A process for the production of aragonite according to claim 1, wherein the first precipitated calcium carbonate aragonite particles introduced into the slaked lime slurry are about 1.0 weight percent of the total weight of the slaked lime slurry.

9. A process for the production of aragonite according to claim 1, wherein the first aragonite particles are introduced in the slaked lime slurry as a component of a seed slaked lime slurry, the seed slaked lime slurry comprising solids of which from about 30 weight percent to about 70 weight percent of the total mass of solids is first aragonite particles.

* * * * *